G. HONOLD.
BEARING FOR ELECTROMAGNETIC SPARKING MACHINES.
APPLICATION FILED FEB. 12, 1908.
1,130,904.
Patented Mar. 9, 1915.
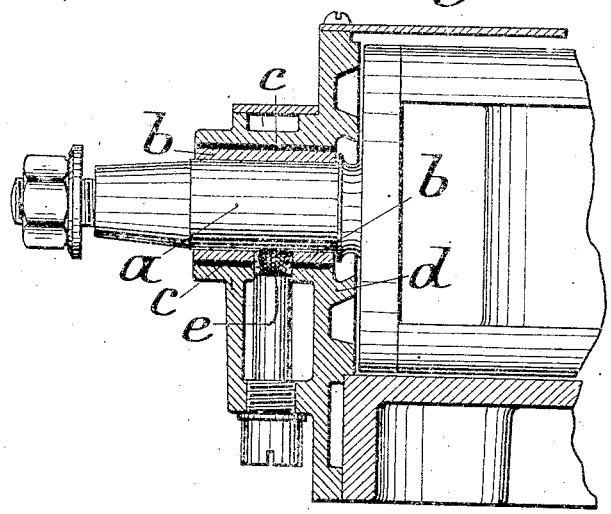
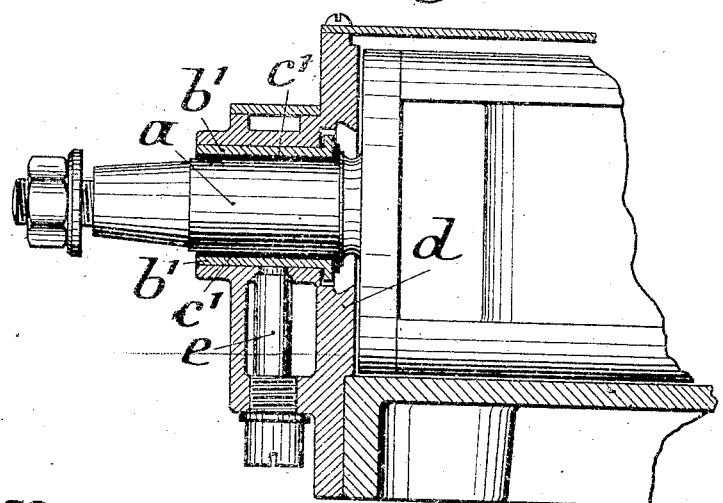

UNITED STATES PATENT OFFICE.

GOTTLOB HONOLD, OF STUTTGART, GERMANY, ASSIGNOR TO THE FIRM OF ROBERT BOSCH, OF STUTTGART, GERMANY.

BEARING FOR ELECTROMAGNETIC SPARKING MACHINES.

1,130,904.

Specification of Letters Patent.   Patented Mar. 9, 1915.

Application filed February 12, 1908. Serial No. 415,483.

*To all whom it may concern:*

Be it known that I, GOTTLOB HONOLD, a subject of the German Emperor, residing at 11 Hoppenlaustrasse, Stuttgart, Germany, have invented certain new and useful Improvements in Bearings for Electromagnetic Sparking Machines; and I do hereby declare the following to be a full, clear, and exact description of the invention, such as will enable others skilled in the art to which it appertains to make and use the same.

The invention relates to electromagnetic sparking machines in which the body of the machine constitutes the magnet poles. With these machines, during each short circuit a part of the current flows through the bearing surfaces of the armature and distributer shafts, even when slip brushes, supposed to transmit the current, are arranged between the rotating and stationary parts in the usual manner. Thus the disturbing influence of the current on the bearings has not been completely removed so far, and when comparison is made between the working of sparking machines, it is found to be a great disadvantage.

The present invention aims at removing this disadvantage and consists essentially in the arrangement of a layer of insulating material separating the shaft or bearing from the body of the machine, the usual slip brushes for transmitting the current being retained at at least one of the armature bearings of the sparking device.

In the accompanying drawings Figures 1 and 2 show sections through machines embodying the invention, which of course can be varied in many ways and is especially applicable to ball bearings.

In both forms the bearing for the driving side of the sparking machine armature is shown, without the current transmitting slip brushes since these as already stated are only necessary at one of the armature bearings and as a rule the back one is chosen for this purpose; moreover, the brushes and their details are known and do not form part of the invention.

In Fig. 1 $a$ is the journal and $b\ b$ the bush which is completely insulated from the rest of the bearing $d$ by the insulating layer $c\ c$, suitable spaces being left in these parts for the wick lubricator $e$.

In Fig. 2 the journal is insulated from the bush and not the bush from the rest of the body. For this purpose a sleeve $b'\ b'$ is mounted on the shaft $a$ with an insulating layer $c'\ c'$ between them, which sleeve rotates with the shaft, its outer surface forming the frictional surface.

Having now particularly described and ascertained the nature of my said invention and in what manner the same is to be performed, I declare that what I claim is:

1. In an electro-magnetic machine, the combination of the machine body having a bearing, an armature shaft having a journal rotatably supported in the bearing, a bushing arranged between the journal and bearing and in fixed relation to one of these parts, and an insulating layer disposed between the bushing and such part.

2. In an electro-magnetic machine, the combination of the machine body having a bearing, an armature shaft having a journal rotatably supported in the bearing, a bushing arranged between the journal and bearing and in fixed relation to the bearing, and an insulating layer disposed between the bushing and bearing.

3. In an electro-magnetic machine, the combination, with the machine body having a bearing, of an insulating layer lining the bearing, a bushing within the insulating layer, said bushing and insulating layer being fixed relative to the bearing, and an armature shaft having a journal rotatable in the said bushing.

4. In an electro-magnetic machine, the combination of a machine body having a bearing, an armature frame rotatably mounted within the body and out of electrical contact therewith, said frame having its axle formed integral therewith and journaled in the bearing, a bushing arranged between the journal and bearing and in fixed relation to one of the parts, and an insulating layer disposed between the bushing and such part whereby to insulate the frame from the body.

In testimony whereof I have hereunto affixed my signature in the presence of two witnesses.

GOTTLOB HONOLD.

Witnesses:
REINHOLD ELWERT,
ERNST ULMER.